(12) United States Patent
Matsuki et al.

(10) Patent No.: US 10,509,229 B2
(45) Date of Patent: Dec. 17, 2019

(54) LIGHT GUIDE DEVICE AND DISPLAY APPARATUS

(71) Applicant: SEIKO EPSON CORPORATION, Tokyo (JP)

(72) Inventors: Hayato Matsuki, Suwa (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/923,547

(22) Filed: Mar. 16, 2018

(65) Prior Publication Data

US 2018/0284447 A1 Oct. 4, 2018

(30) Foreign Application Priority Data

Mar. 28, 2017 (JP) ................................ 2017-062401

(51) Int. Cl.
*G02B 27/01* (2006.01)
*F21V 8/00* (2006.01)

(52) U.S. Cl.
CPC ......... *G02B 27/0172* (2013.01); *G02B 6/003* (2013.01); *G02B 6/0055* (2013.01); *G02B 2027/0178* (2013.01)

(58) Field of Classification Search
CPC ...... G02B 6/00; G02B 27/01; G02B 2027/01; F21V 8/00
See application file for complete search history.

(56) References Cited

U.S. PATENT DOCUMENTS

| 8,743,464 B1* | 6/2014 | Amirparviz | G02B 27/01 359/633 |
|---|---|---|---|
| 8,873,150 B2 | 10/2014 | Amitai | |
| 9,248,616 B2 | 2/2016 | Amitai | |
| 2003/0165017 A1 | 9/2003 | Amitai | |
| 2014/0111865 A1* | 4/2014 | Kobayashi | G02B 5/003 359/633 |

(Continued)

FOREIGN PATENT DOCUMENTS

| JP | 5698297 B2 | 4/2015 |
|---|---|---|
| JP | 2016-177231 A | 10/2016 |

(Continued)

*Primary Examiner* — Cara E Rakowski
*Assistant Examiner* — Danell L Owens
(74) *Attorney, Agent, or Firm* — Oliff PLC

(57) ABSTRACT

A light guide system (light guide device) includes a transparent light guide portion that guides light beams incident from one end side to a light-emitting portion. The light guide portion includes a first surface, a second surface which is parallel to the first surface, and a third surface which is positioned between the first surface and the second surface on another end side. A plurality of obliquely-inclined partial reflection surfaces are disposed between the first surface and the second surface, and the third surface is inclined in the same direction as that of the partial reflection surface. The third surface is configured with an anti-reflection surface for image light beams traveling through the light guide portion, and is covered by an anti-reflection film, a light absorption layer, a moth-eye type roughened surface, or the like. Therefore, occurrence of stray light due to reflection by the third surface can be suppressed.

20 Claims, 12 Drawing Sheets

(56) References Cited

U.S. PATENT DOCUMENTS

| | | | | |
|---|---|---|---|---|
| 2014/0226215 A1* | 8/2014 | Komatsu | ............ | G02B 27/0172 |
| | | | | 359/631 |
| 2015/0323788 A1* | 11/2015 | Zou | ........................ | G02B 27/30 |
| | | | | 359/630 |
| 2016/0246056 A1* | 8/2016 | Dobschal | ........... | G02B 27/0081 |
| 2016/0282622 A1* | 9/2016 | Hiraide | .............. | G02B 27/0176 |
| 2017/0192239 A1* | 7/2017 | Nakamura | ........... | G02B 6/0036 |

FOREIGN PATENT DOCUMENTS

| | | | | |
|---|---|---|---|---|
| WO | WO-0014577 A1 * | 3/2000 | ........... | G02B 5/0858 |
| WO | 01/95027 A2 | 12/2001 | | |

* cited by examiner

FIG. 3

| SURFACE NUMBER | | | (3) | (4) | (5) | (6) | (7) | (8) |
|---|---|---|---|---|---|---|---|---|
| CURVATURE RADIUS | 1/C | | 47.32704 | 20.43138 | -94.4124 | -18.27486461 | -32.55955172 | -20.5164 |
| NORMALIZED RADIUS | R0 | | 10 | 10 | 10 | 1 | 1 | 10 |
| CONIC COEFFICIENT | k | | 0 | 0 | 0 | 0 | 0 | 0 |
| ASPHERICAL COEFFICIENT An,m | n | m | | | | | | |
| | 1 | 0 | 0 | 0 | 0 | 0 | 0 | 0 |
| | 0 | 1 | 0 | 0 | 0 | 0 | 0 | 0 |
| | 2 | 0 | 0.30111 | -0.65248 | 7.481127 | 0 | 0 | 22.199 |
| | 1 | 1 | 0 | 0 | 0 | 0 | 0 | 0 |
| | 0 | 2 | -1.49649 | -2.19068 | -0.97359 | 0 | 0 | -2.20855 |
| | 3 | 0 | 0 | 0 | 0 | 0 | 0 | 0 |
| | 2 | 1 | -0.38934 | -0.48843 | 4.307729 | 0 | 0 | 0.825022 |
| | 1 | 2 | 0 | 0 | 0 | 0 | 0 | 0 |
| | 0 | 3 | -0.17699 | -0.20942 | -1.57325 | 0 | 0 | -0.6926 |
| | 4 | 0 | 1.190703 | 0.462939 | 0.057625 | 0.000448014 | 0.000395598 | 115.6255 |
| | 3 | 1 | 0 | 0 | 0 | 0 | 0 | 0 |
| | 2 | 2 | 0.36527 | -0.18742 | 0.522778 | 0.000896029 | 0.000791197 | -30.5015 |
| | 1 | 3 | 0 | 0 | 0 | 0 | 0 | 0 |
| | 0 | 4 | -0.10208 | -0.05259 | 0.783201 | 0.000448014 | 0.000395598 | 0.171161 |
| | 5 | 0 | 0 | 0 | 0 | 0 | 0 | 0 |
| | 4 | 1 | -0.75152 | 0.310014 | 5.331907 | 0 | 0 | 69.49481 |
| | 3 | 2 | 0 | 0 | 0 | 0 | 0 | 0 |
| | 2 | 3 | 0.067009 | -0.5254 | 0.2932 | 0 | 0 | -2.61446 |
| | 1 | 4 | 0 | 0 | 0 | 0 | 0 | 0 |
| | 0 | 5 | -0.08797 | -0.26988 | 0.207203 | 0 | 0 | -0.27466 |
| | 6 | 0 | 2.007158 | 0.033345 | -1.17421 | -2.97E-06 | -8.19E-07 | 1182.16 |
| | 5 | 1 | 0 | 0 | 0 | 0 | 0 | 0 |
| | 4 | 2 | 0.637684 | -0.03644 | 12.61574 | -8.90E-06 | -2.46E-06 | -409.229 |
| | 3 | 3 | 0 | 0 | 0 | 0 | 0 | 0 |
| | 2 | 4 | 0.034959 | 0.704564 | -11.3076 | -8.90E-06 | -2.46E-06 | 6.221191 |
| | 1 | 5 | 0 | 0 | 0 | 0 | 0 | 0 |
| | 0 | 6 | 0.070356 | -0.1718 | -5.68874 | -2.97E-06 | -8.19E-07 | -0.66636 |

$$Z = \frac{c \cdot (x^2 + y^2)}{1 + \sqrt{1 - (1+K)c^2 \cdot (x^2 + y^2)}} + \sum\sum (Cj(m,n) \times x^m \times y^n)$$

$$j = [(m+n)^2 + m + 3n]/2 + 1$$

(EQUATION 1)

| SURFACE NUMBER | SURFACE INTERVAL | REFRACTIVE INDEX (nd) | ABBE NUMBER ($\nu$) |
|---|---|---|---|
| (3) | 7.7 | 1.531 | 56 |
| (4) | 4.9 | 1.531 | 56 |
| (3) | 2.5 | | |
| (5) | 6 | 1.531 | 56 |
| (6) | 1.2 | | |
| (7) | 2.3 | 1.585 | 30 |
| (8) | 2.1 | | |

LIGHT GUIDE DEVICE AND DISPLAY APPARATUS

BACKGROUND

1. Technical Field

The present disclosure relates to a light guide device and a display apparatus.

2. Related Art

As a light guide portion of a light guide device used in a display apparatus or the like, a configuration in which a plurality of obliquely-inclined half mirrors are provided in parallel between two flat surfaces (a first surface and a second surface) extending from one end side on which image light beams are incident toward another end side, has been proposed (refer to JP-A-2016-177231). In the light guide device, the image light beams are reflected between the first surface and the second surface, travel through the light guide portion from one end side toward another end side, and are emitted from the half mirrors toward an eye of an observer. Thus, the observer can recognize a virtual image, and light beams from the outside can reach the eye of the observer via the light guide portion. In addition, in JP-A-2016-177231, a technique in which all of the first surface, the second surface, and a third surface orthogonal to the first surface and the second surface are covered with a protective layer at an end portion of the light guide portion on another end side, has been proposed.

In the light guide device described in JP-A-2016-177231, when the image light beams are reflected between the first surface and the second surface and travel through the light guide portion, the light beams, which transmit through the half mirror positioned at a position closest to another end side, are reflected by the third surface, and as a result, stray light occurs. When the stray light is reflected by the half mirror and is emitted, there is a problem that ghost occurs on an image. In JP-A-2016-177231, although a technique in which an anti-reflection coating layer is provided on a surface of the protective layer has been proposed, because the anti-reflection coating layer is also formed on the first surface of the light guide portion and the like, the anti-reflection coating layer is a layer for preventing reflection of light from the outside when the light is incident on the light guide portion and is not a layer for suppressing the occurrence of ghost.

SUMMARY

An advantage of some aspects of the embodiment is to provide a light guide device and a display apparatus capable of suppressing occurrence of stray light due to reflection by an end surface of a light guide portion.

According to an aspect of the embodiment, there is provided a light guide device including: a transparent light guide portion that guides light beams incident from one end side to a light-emitting portion, in which the light guide portion includes a first surface that extends from the one end side on which the light beams are incident toward another end side in a first direction, a second surface that extends in the first direction and in parallel to the first surface in one side of a second direction intersecting with the first direction, a third surface that is positioned between the first surface and the second surface at the another end side of the light guide portion, and a plurality of partial reflection surfaces that are disposed along the first direction between the first surface and the second surface and are inclined at the same angle from a normal direction with respect to the second surface toward the one end side when viewed from a third direction intersecting with the first direction and the second direction, and in which the third surface is a surface with an anti-reflection structure.

In this configuration, the light beams are reflected between the first surface and the second surface, travel through the light guide portion from one end side toward the another end side, are reflected by the partial reflection surfaces, and are emitted. At this time, even in a case where the light beams, which transmit through the partial reflection surface positioned at a position closest to the another end side, reach the third surface (end surface) of the light guide portion, the third surface is an anti-reflection surface, and thus occurrence of stray light due to reflection by the third surface can be suppressed.

BRIEF DESCRIPTION OF THE DRAWINGS

The embodiment will be described with reference to the accompanying drawings, wherein like numbers reference like elements.

FIG. 3 is an explanatory diagram illustrating design examples of a projection lens system and a light-incident portion illustrated in FIG. 2.

DESCRIPTION OF EXEMPLARY EMBODIMENTS

Figure 1:
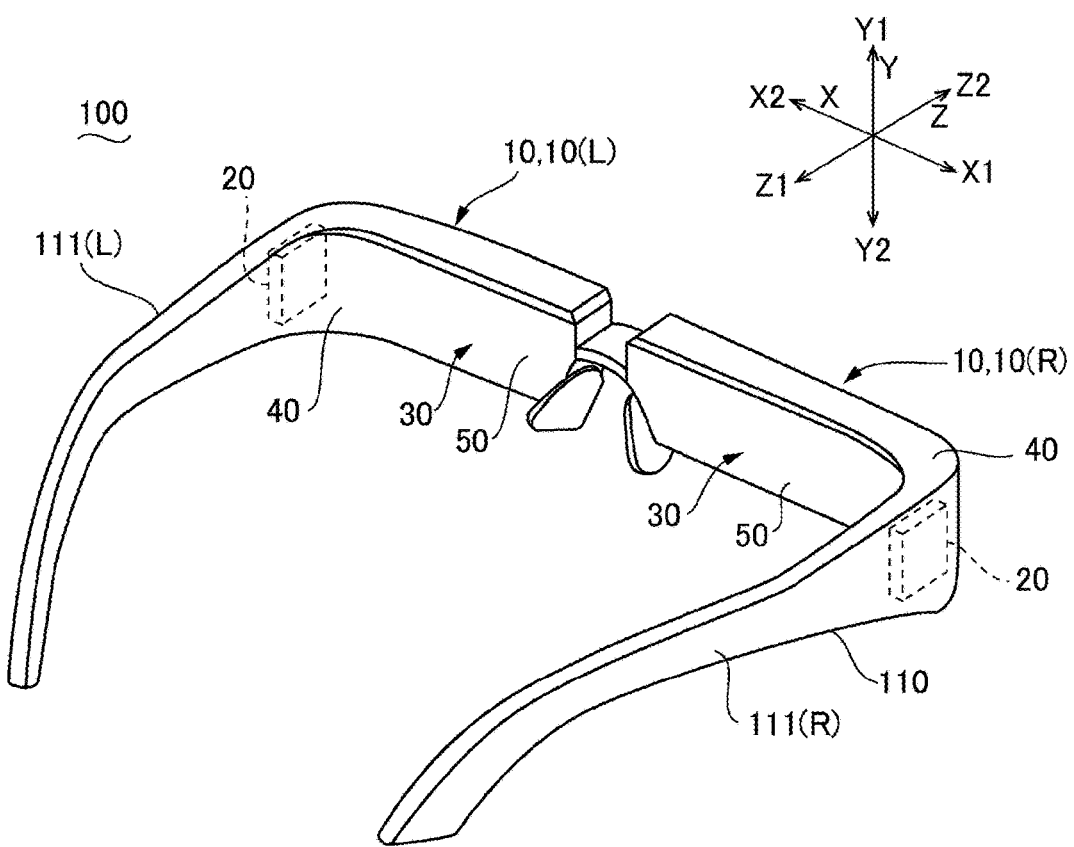
FIG. 1 is an explanatory view illustrating an example of an appearance of a display apparatus according to a first embodiment.

Hereinafter, embodiments according to the disclosure will be described. In the drawings to be referred to in the following description, in order to make each layer and each member to be recognizable on the drawings, the number and the scale of each layer and each member are made different.

First Embodiment

Overall Configuration

FIG. 1 is an explanatory view illustrating an example of an appearance of a display apparatus 100 according to a first embodiment. The display apparatus 100 illustrated in FIG. 1 is configured with a see-through type eye glass display or the like, and includes a frame 110 provided with temples 111(R) and 111(L) on left and right sides thereof. In the display apparatus 100, a display unit 10 to be described is supported by the frame 110, and an image emitted from the display unit 10 is recognized by a user, as a virtual image. In the present embodiment, the display apparatus 100 includes a right-eye display unit 10(R) and a left-eye display unit 10(L) as the display unit 10. The right-eye display unit 10(R) and the left-eye display unit 10(L) have the same configuration, and are disposed symmetrically in a right-left direction. Thus, in the following description, the right-eye display unit 10(R) will be mainly described, and a description of the left-eye display unit 10(L) will be omitted. In the following description, a right-left direction is referred to as a first direction X, a front-rear direction is referred to as a second direction Z, and an upper-and-lower direction is referred to as a third direction Y. In addition, one side (right side) in the first direction X is referred to as X1, the other side (left side) in the first direction X is referred to as X2, one side (rear side) in the second direction Z is referred to as Z1, the other side (front side) in the second direction Z is referred to as Z2, one side (upper side) in the third direction Y is referred to as Y1, and the other side (lower side) in the third direction Y is referred to as Y2. Here, since the right-eye display unit 10(R) and the left-eye display unit 10(L) are disposed symmetrically, in the right-eye display unit 10(R) and the left-eye display unit 10(L), one side X1 and the other side X2 in the first direction X are reversed to each other in a right-left direction.

Overall Configuration of Display Unit 10

Figure 2:
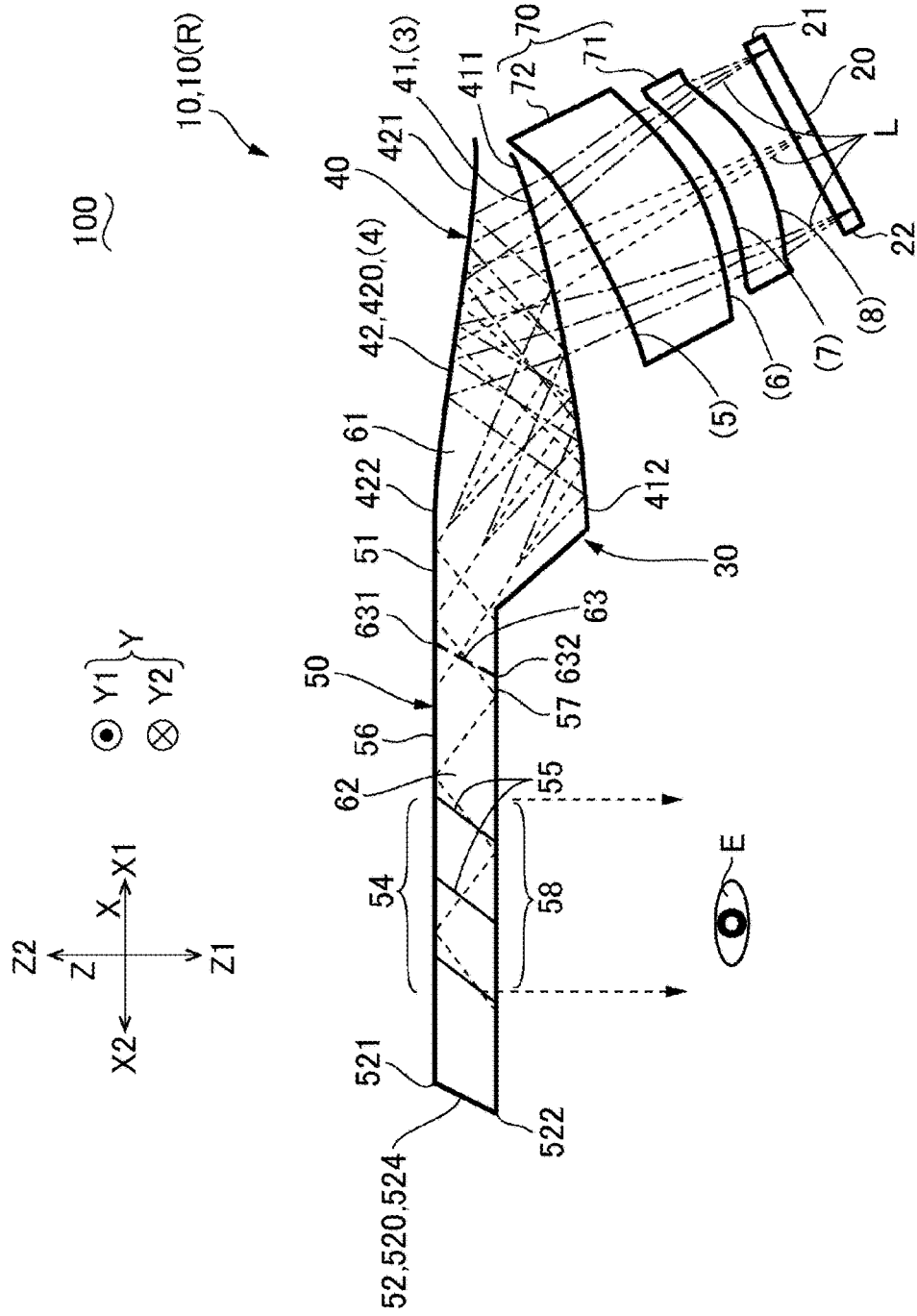
FIG. 2 is a plan view of an optical system of the display apparatus illustrated in FIG. 1.

FIG. 2 is a plan view of an optical system of the display unit 10 illustrated in FIG. 1. In FIG. 2, image light beams L emitted from the center of an image generation system 20 are illustrated by dotted lines, and image light beams L emitted from end portions of the image generation system 20 are illustrated by one-dot chain lines and two-dot chain lines.

As illustrated in FIG. 2, the display unit 10 (display unit 10(R)) includes an image generation system 20 that emits image light beams L as non-parallel light beams and a light guide system 30 that guides the incident image light beams L to a light-emitting portion 58, and the light guide system 30 is a light guide device to which the embodiment is applied. In the present embodiment, a projection lens system 70 is disposed between the image generation system 20 and the light guide system 30 (light guide device), and the image light beams L emitted from the image generation system 20 are incident on the light guide system 30 via the projection lens system 70. The projection lens system 70 includes two lenses including a first lens 71 and a second lens 72 disposed between the first lens 71 and the light guide system 30.

The light guide system 30 includes a transparent light-incident portion 40 that includes a light-incident curved surface 41 on which the image light beams L are incident and a light-reflective curved surface 42 which reflects the image light beams L incident from the light-incident curved surface 41 between the light-incident curved surface 41 and the light-reflective curved surface 42 such that the reflected image light beams L are converted into parallel light beams, and a transparent light guide portion 50 to which the one end 51 side of the light guide portion 40 in the first direction X is connected. The light guide portion 50 guides the parallel light beams which are incident from the light-incident portion 40, to the light-emitting portion 58. The light guide portion 50 includes a first surface 56 (first reflection surface) extending from the one end 51 (end portion in one side X1) toward the other end 52 in the first direction X (end portion in the other side X2), a second surface 57 (second reflection surface) extending in the first direction X in parallel with the first surface 56 and in one side Z1 of the second direction Z intersecting with the first direction X, and the light-emitting portion 58 which is provided at a portion of the second surface 57 away from the light-incident portion 40. In the light guide system 30 with this configuration, the parallel light beams emitted from the light-incident portion 40 to the light guide portion 50 are reflected between the first surface 56 and the second surface 57, are guided to the light-emitting portion 58 from one side X1 to the other side X2 in the first direction X, and are emitted from the light-emitting portion 58.

Detailed Configuration of Image Generation System 20

The image generation system 20 is a light modulation panel configured with a liquid crystal device, an organic electroluminescence device, or the like, and is disposed so as to face the light-incident curved surface 41 in one side X1 of the first direction X and in one side Z1 of the second direction Z with respect to the light-incident portion 40. In the present embodiment, the image generation system 20 is disposed obliquely such that an end portion 21 thereof in one side X1 of the first direction X is positioned toward the other side Z2 of the second direction Z than the other end portion 22 thereof in the other side X2 of the first direction X is.

Detailed Configuration of Light-Incident Portion 40

In the light-incident portion 40, the light-incident curved surface 41 is a surface toward one side Z1 of the second direction Z, and faces the image generation system 20 via the projection lens system 70. Thus, the light-incident curved surface 41 is disposed obliquely such that an end portion 411 in the other side Z2 of the second direction Z is positioned toward one side X1 of the first direction X than an end portion 412 in one side Z1 of the second direction Z is. On the other hand, a distance between the end portion 412 of the light-incident curved surface 41 and the end portion 22 of the image generation system 20 is wider than a distance between the end portion 411 of the light-incident curved surface 41 and the end portion 21 of the image generation system 20. The light-incident curved surface 41 is made of a curved surface such as an aspherical surface or a free curved surface, and in the present embodiment, the light-incident curved surface 41 is made of a convex-shaped free curved surface. Although a reflection film or the like is not formed on the light-incident curved surface 41, the light-incident curved surface 41 totally reflects light beams which are incident at an incident angle equal to or larger than a critical angle. Thus, the light-incident curved surface 41 has transparency and reflectivity.

The light-reflective curved surface 42 is a surface toward the other side Z2 of the second direction Z, and is disposed obliquely such that an end portion 421 in one side X1 of the first direction X is positioned toward one side Z1 of the second direction Z than an end portion 422 in the other side X2 of the first direction X is. The light-reflective curved surface 42 is made of a curved surface such as an aspherical surface or a free curved surface, and in the present embodiment, the light-reflective curved surface 42 is made of a convex-shaped free curved surface. The light-reflective curved surface 42 may employ a configuration in which a reflection film or the like is not formed and light beams incident at an incident angle equal to or larger than a critical angle are totally reflected. Here, in the present embodiment, the light-reflective curved surface 42 is provided with a reflective metal layer 420 including aluminum, silver, magnesium, chromium, or the like as a main component. Thus, even in a case where the incident angle with respect to the light-reflective curved surface 42 is small, the light-reflective curved surface 42 can reliably reflect the incident light beams.

In the light-incident portion 40 with this configuration, when the image light beams L as non-parallel light beams are incident on the light-incident curved surface 41, the image light beams L incident from the light-incident curved surface 41 are refracted by the light-incident curved surface 41, and are directed toward the light-reflective curved surface 42. Next, the image light beams L are reflected by the light-reflective curved surface 42, and are directed again toward the light-incident curved surface 41. At this time, since the image light beams L are incident on the light-incident curved surface 41 at an incident angle equal to or larger than a critical angle, the image light beams L are reflected by the light-incident curved surface 41 toward the light guide portion 50. Meanwhile, the image light beams L are converted into parallel light beams. Therefore, since the image light beams L are converted into parallel light beams by using the light-reflective curved surface 42 and the light-incident curved surface 41, a design requirement for the projection lens system 70 can be relaxed. Thereby, it is possible to simplify the projection lens system 70. For example, the projection lens system 70 can be configured with two lenses (the first lens 71 and the second lens 72). In addition, since the projection lens system 70 can be simplified, it is possible to reduce a size and a weight of the display apparatus 100 (display unit 10).

Design Examples of Projection Lens System 70 and Light-Incident Portion 40

FIG. 3 is an explanatory diagram illustrating design examples of the projection lens system 70 and the light-incident portion 40 illustrated in FIG. 2. The first lens 71, the second lens 72, the light-incident curved surface 41, and the light-reflective curved surface 42 are configured as illustrated in FIG. 3. In an upper portion of FIG. 3, coefficients of a free curved surface which is represented by Equation 1 illustrated in FIG. 3 are indicated. In a lower portion of FIG. 3, a refractive index (nd) and an Abbe number (v) of a material that constitutes the first lens 71, the second lens 72, and the light-incident portion 40 are indicated. Among surface numbers (3) to (8) illustrated in FIG. 3, a surface number (3) corresponds to the light-incident curved surface 41, and a surface number (4) corresponds to the light-reflective curved surface 42. A surface number (5) corresponds to a lens surface of the second lens 72 on a light-emitting side, and a surface number (6) corresponds to a lens surface of the second lens 72 on a light-incident side. A surface number (7) corresponds to a lens surface of the first lens 71 on a light-emitting side, and a surface number (8) corresponds to a lens surface of the first lens 71 on a light-incident side.

Detailed Configuration of Light Guide Portion 50

The first surface 56 and the second surface 57 of the light guide portion 50 are disposed in parallel, and the light guide portion 50 includes a third surface 520 between the first surface 56 and the second surface 57, the third surface being disposed on the other end 52 of the light guide portion 50. A thickness between the first surface 56 and the second surface 57 in the second direction Z (a dimension of the light guide portion 50 in the second direction Z) is thinner than a dimension of the light-incident portion 40 in the second direction Z. The first surface 56 and the second surface 57 totally reflect the light beams which are incident at an incident angle equal to or larger than a critical angle, according to a difference in refractive index between the light guide portion 50 and the outside (air). Therefore, a reflection film or the like is not formed on the first surface 56 and the second surface 57.

At a portion of the light guide portion 50 away from the light-incident portion 40, a plurality of partial reflection surfaces 55 are disposed in parallel with each other and at equal intervals along the first direction X, the partial reflection surfaces 55 being inclined toward one side X1 of the first direction X from a normal direction with respect to the second surface 57 when viewed from the third direction Y. The light-emitting portion 58 is a portion of the second surface 57 that overlaps with the plurality of partial reflection surfaces 55 in the first direction X, and is a region with a predetermined width in the first direction X.

Each of the plurality of partial reflection surfaces 55 is made of a dielectric multilayer film. In addition, at least one of the plurality of partial reflection surfaces 55 may be a composite layer of a dielectric multilayer film and a reflective metal layer (thin film) including aluminum, silver, magnesium, chromium, or the like as a main component. In a case where the partial reflection surface 55 is configured to include a metal layer, there is an effect in that a reflectance of the partial reflection surface 55 can be increased, and in that an incident angle dependence and a polarization dependence on a transmittance and a reflectance of the partial reflection surface 55 can be optimized.

In the light guide portion 50 with this configuration, the image light beams L as parallel light beams which are incident from the light-incident portion 40 are reflected between the first surface 56 and the second surface 57, and travel from one side X1 to the other side X2 in the first direction X. A part of the image light beams L incident on the partial reflection surface 55 is reflected by the partial reflection surface 55, and is emitted from the light-emitting portion 58 toward an eye E of an observer. In addition, the rest of the image light beams L incident on the partial reflection surface 55 transmit through the partial reflection surface 55, and are incident on the next partial reflection surface 55 which is adjacent to the partial reflection surface 55 in the other side X2 of the first direction X. Thus, in each of the plurality of partial reflection surfaces 55, the image light beams L reflected toward one side Z1 of the second direction Z are emitted from the light-emitting portion 58 toward the eye E of the observer. Therefore, the observer can recognize a virtual image. At that time, when light beams are incident from the outside to the light guide portion 50, the light beams are incident on the light guide portion 50, transmit through the partial reflection surface 55, and reach the eye E of the observer. Therefore, the observer can see the image generated by the image generation system 20, and can see a scenery or the like of the outside in a see-through manner.

Countermeasure Against Reflection on Third Surface 520

Figure 4:
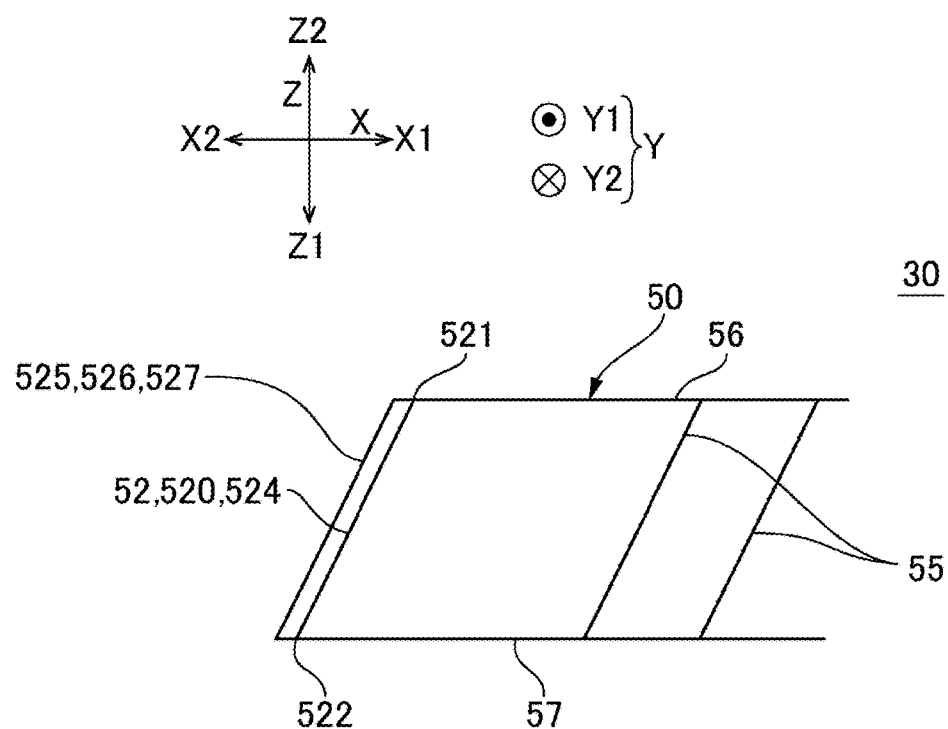
FIG. 4 is an enlarged explanatory diagram of a third surface illustrated in FIG. 2.

FIG. 4 is an enlarged explanatory diagram of the third surface 520 illustrated in FIG. 2. In the light guide system 30 described with reference to FIG. 2, the third surface 520 of the light guide portion 50 is configured with an anti-reflection surface 524 having an anti-reflection structure for the image light beams L traveling through the light guide portion 50. Therefore, even in a case where the light beams, which transmit through the partial reflection surface 55 positioned at a position closest to the other end 52 side, reach the third surface 520 (end surface) of the light guide portion 50, occurrence of stray light due to reflection by the third surface 520 can be suppressed. Accordingly, the light beams reflected by the third surface 520 is not likely to be reflected by the partial reflection surface 55 and to reach the eye E of the observer, and thus occurrence of ghost on the image can be suppressed.

In the present embodiment, as illustrated in FIG. 4, the third surface 520 is formed of an anti-reflection surface 524, and an anti-reflection film 525 covers the third surface 520. The anti-reflection film 525 is, for example, a dielectric multilayer film 526. In this case, the image light beams L traveling through the light guide portion 50 transmit through the third surface 520, and are emitted toward the other side X2 of the first direction X.

In some cases, the anti-reflection film 525 is configured with a black light absorption layer 527. In this case, the image light beams L traveling through the light guide portion 50 are absorbed by the light absorption layer 527 on the third surface 520. In some cases, the light absorption layer 527 is formed by stacking a plating layer and a black resin layer in order. In any case, it is preferable to form the light absorption layer 527 after the third surface 520 is roughened.

In addition, as the anti-reflection film 525, a composite layer in which the dielectric multilayer film 526 and the light absorption layer 527 are stacked in order may be used. In this configuration, the light beams which transmit through the dielectric multilayer film 526 can be absorbed by the light absorption layer 527. Therefore, it is not necessary to roughen the third surface 520. In addition, when the display apparatus 100 illustrated in FIG. 1 is mounted on a head, it is possible to prevent the third surface 520 from shining near a nose due to the image light beams L which transmit through the third surface 520.

State of Parallel Light Flux in Light Guide Portion 50

Figure 5:
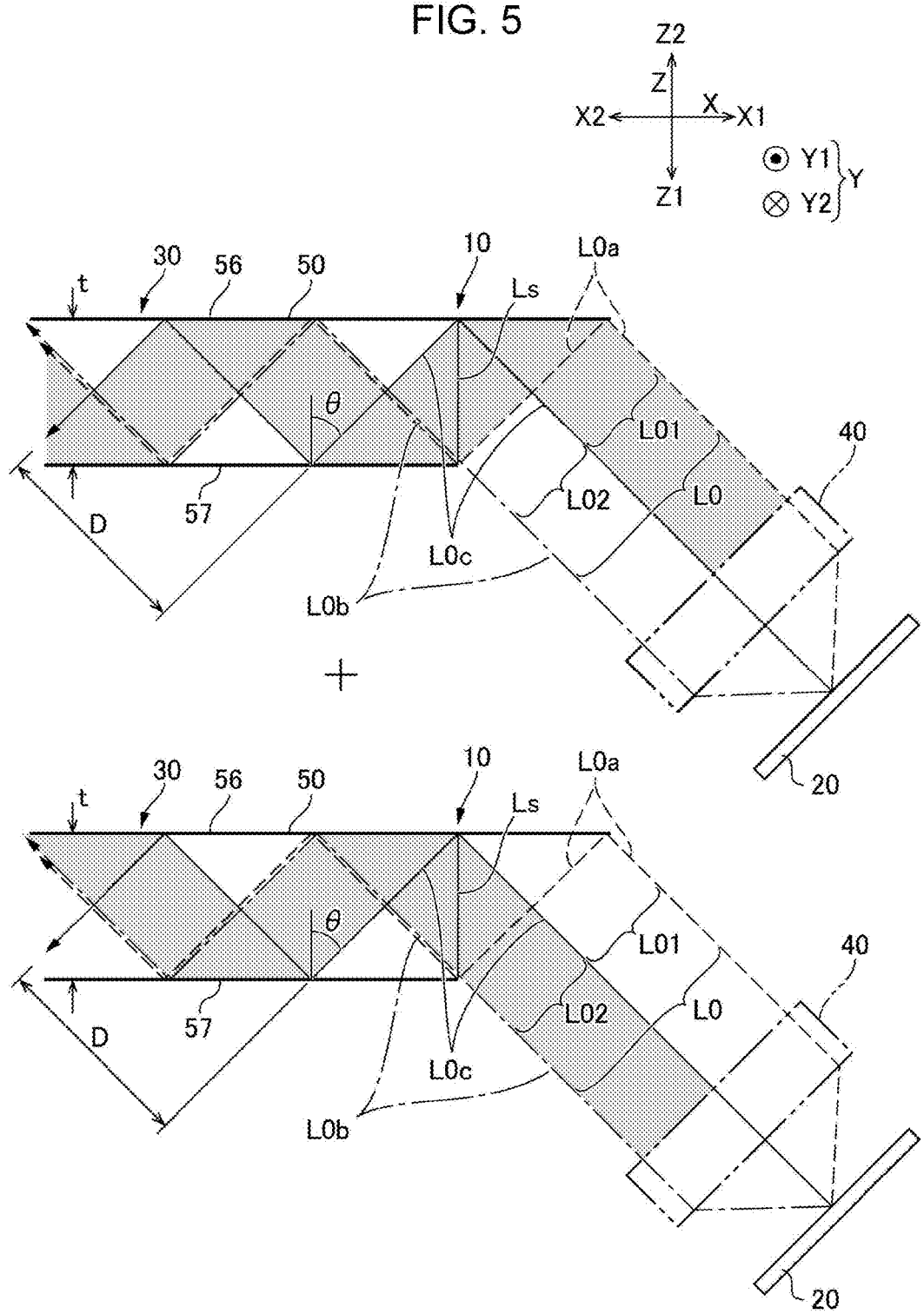
FIG. 5 is an explanatory diagram schematically illustrating a state of a parallel light flux in a light guide portion illustrated in FIG. 2.

FIG. 5 is an explanatory diagram schematically illustrating a state of a parallel light flux in the light guide portion 50 illustrated in FIG. 2, and schematically illustrates a state where a non-parallel light flux is converted into a parallel light flux L0 (image light beam L) by the light-incident portion 40 and then the parallel light flux L0 is viewed from the third direction Y, the non-parallel light flux being incident on the light-incident curved surface 41 of the light-incident portion 40 from the same portion of the image generation system 20 via the projection lens system 70. In FIG. 5, a center light beam L0c of the parallel light flux L0 is illustrated by a solid line, a first light beam L0a which is positioned at one end portion of the parallel light flux L0 is illustrated by a long broken line, and a second light beam L0b which is positioned at the other end portion of the parallel light flux L0 is illustrated by a one-dot chain line. In addition, in an upper portion of FIG. 5, a first parallel light flux portion L01 interposed between the center light beam L0c and the first light beam L0a is illustrated by a gray color, and in a lower portion of FIG. 5, a second parallel light flux portion L02 interposed between the center light beam L0c and the second light beam L0b is illustrated by a gray color.

As illustrated in FIG. 5, in the display unit 10, when the non-parallel light flux is converted into a parallel light flux L0 by the light-incident portion 40 and then the parallel light flux L0 is viewed from the third direction Y, the non-parallel light flux being incident on the light-incident curved surface 41 of the light-incident portion 40 from the same portion of the image generation system 20, the inside of one end portion (a portion in one side X1 of the first direction X) of the light guide portion 50 at which the light-incident portion 40 is positioned is filled with the parallel light flux L0. More specifically, in the parallel light flux L0, when the first parallel light flux portion L01 (gray portion) interposed between the center light beam L0c and the first light beam L0a is combined with the second parallel light flux portion L02 (gray portion) interposed between the center light beam L0c and the second light beam L0b of the parallel light flux L0, the inside of the light guide portion 50 is filled with the parallel light flux L0. Therefore, even when a thickness of the light guide portion 50 in the second direction Z is thin, the observer can recognize a virtual image with high brightness.

For example, assuming that the first surface 56 and the second surface 57 are parallel to each other, that a light flux diameter of the parallel light flux L0 is D, that a distance between the first surface 56 and the second surface 57 in the second direction Z is t, and that an incident angle of the parallel light flux L0 with respect to the first surface 56 and the second surface 57 is θ, such a configuration can be realized by setting the light flux diameter D, the distance t, and the incident angle θ so as to satisfy the following conditional equation.

$$D=2t\times\sin\theta$$

In other words, positions at which the first light beam L0a and the second light beam L0b are incident on the second surface 57 are set so as to be positioned on an imaginary normal line Ls at a position at which the center light beam L0c is incident on the first surface 56, and thus the configuration can be realized. As illustrated in FIG. 2, although the image light beams L are emitted from each portion of the image generation system 20, in the present embodiment, the image light beams L emitted from each portion of the image generation system 20 satisfy the above condition.

Bonding Structure

Figure 6:
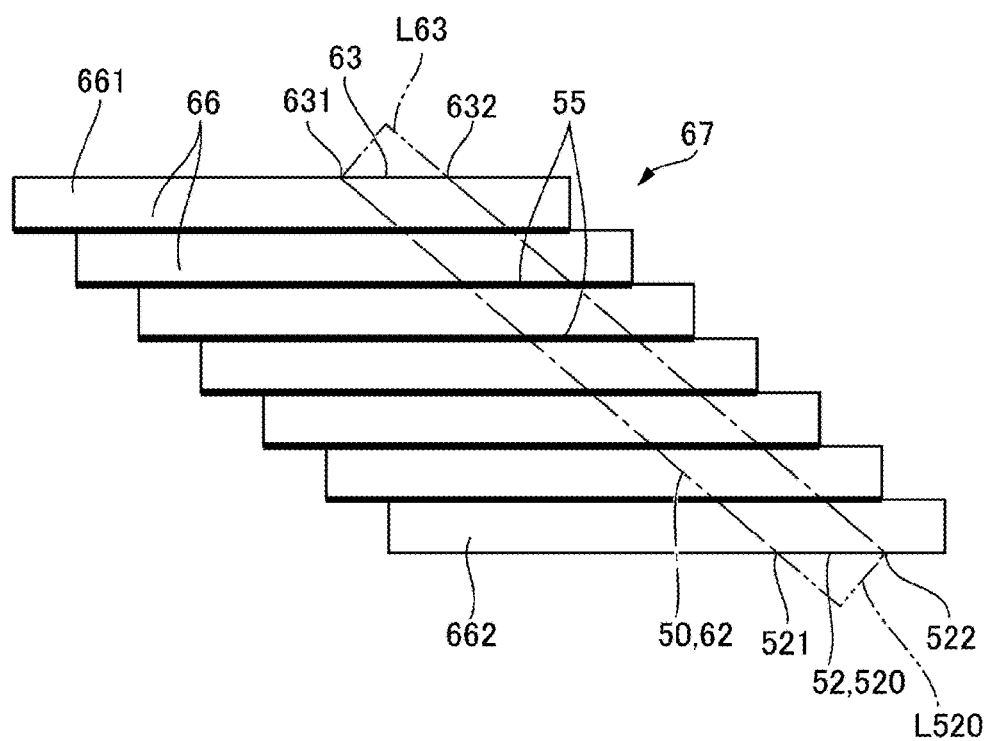
FIG. 6 is an explanatory diagram illustrating a manufacturing method of the light guide portion illustrated in FIG. 2.
Figure 7:
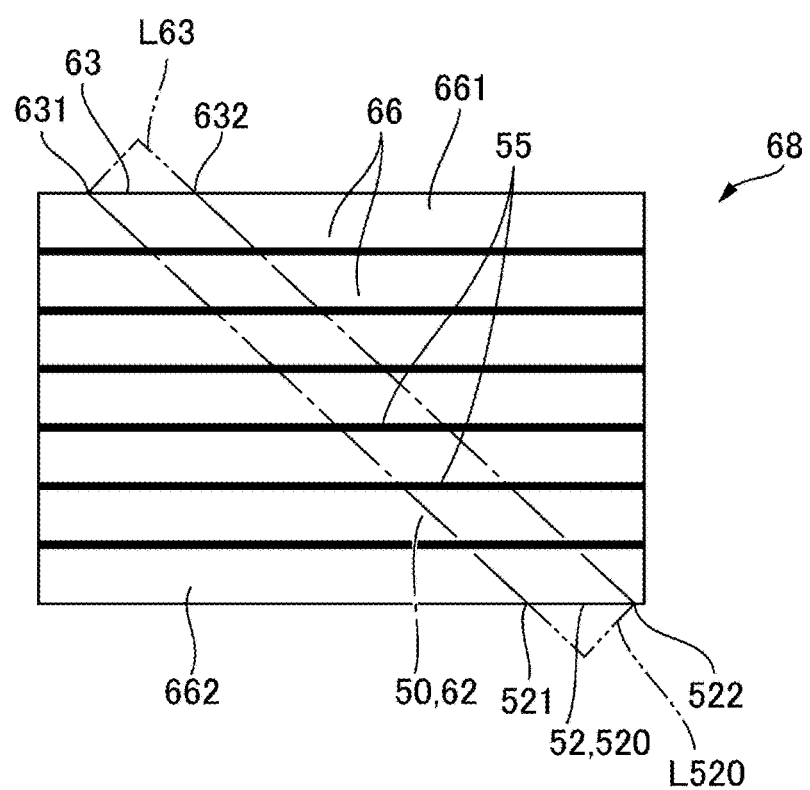
FIG. 7 is an explanatory diagram illustrating another manufacturing method of the light guide portion illustrated in FIG. 2.

Referring to FIG. 2 again, in the present embodiment, the light-incident portion 40 is formed of a first transparent member 61, a portion 54 of the light guide portion 50 at which at least the plurality of partial reflection surfaces 55 are formed is formed of a second transparent member 62 which is surface-bonded to the first transparent member 61 via a bonding surface 63 (first bonding surface) in the first direction X. Therefore, the bonding surface 63 is positioned between the portion at which the plurality of partial reflection surfaces 55 are formed and the light-incident portion 40. In this configuration, the light-incident portion 40 and the partial reflection surfaces 55 can be manufactured by an appropriate method. For example, the light-incident portion 40 is configured with a resin molded component made of a cycloolefin polymer or the like, while the portion 54 of the light guide portion 50 at which the plurality of partial reflection surfaces 55 are formed is formed, as illustrated in FIGS. 6 and 7, by stacking transparent substrates with the partial reflection surfaces 55 interposed therebetween and connecting the transparent substrates with each other.

In the present embodiment, a first end portion 631 of the bonding surface 63 in the other side Z2 of the second direction Z is positioned between the first surface 56 and a reflection region of the light-incident portion 40, and a second end portion 632 of the bonding surface 63 in one side Z1 of the second direction Z is positioned between the second surface 57 and the reflection region of the light-incident portion 40. More specifically, the second end portion 632 of the bonding surface 63 is positioned between the region (reflection region) of the light-incident curved surface 41 on which the image light beams L are incident from the light-reflective curved surface 42 and the second surface 57. In addition, the first end portion 631 of the bonding surface 63 is positioned between the region (reflection region) of the light-reflective curved surface 42 on which the image light beams L are incident from the light-incident curved surface 41 and the first surface 56. Therefore, the bonding surface 63 is less likely to hinder appropriate reflection in the light-incident portion 40 and appropriate reflection in the light guide portion 50.

Configuration of Bonding Surface 63 and Third Surface 520

The first end portion 631 of the bonding surface 63 is positioned at a position closer to the one end 51 side than the second end portion 632 is. In the present embodiment, the bonding surface 63 is a flat surface which is inclined in the same direction as that of the partial reflection surface 55. In the present embodiment, the bonding surface 63 is a flat surface which is parallel to the partial reflection surface 55.

In the third surface 520, a first edge portion 521 positioned on the other side Z2 of the second direction Z is positioned closer to the one end 51 side than a second edge portion 522 positioned on one side Z1 of the second direction Z is. In the present embodiment, the third surface 520 is a flat surface which is inclined in the same direction as that of the partial reflection surface 55. In the present embodiment, the third surface 520 is a flat surface which is parallel to the partial reflection surface 55.

Manufacturing Method of Light Guide Portion 50

FIG. 6 is an explanatory diagram illustrating a manufacturing method of the light guide portion 50 illustrated in FIG. 2. FIG. 7 is an explanatory diagram illustrating another manufacturing method of the light guide portion 50 illustrated in FIG. 2. In order to manufacture the light guide portion 50 (second transparent member 62) illustrated in FIG. 2, as illustrated in FIG. 6, a plurality of transparent substrates 66, each of which includes the partial reflection surface 55 formed on one side thereof, are overlapped while being shifted, and in this state, the transparent substrates 66 are bonded to each other via a bonding layer while applying a load to the transparent substrates 66, thereby forming a stacked body 67. At this time, the transparent substrates 66 on which the partial reflection surfaces 55 are not formed are also stacked. Next, the stacked body 67 is cut obliquely. As a result, the light guide portion 50 (second transparent member 62) is obtained. At this time, since the first surface 56 and the second surface 57 are formed by cut surfaces, polishing or the like is performed on the cut surfaces. The transparent substrates 66 are glass substrates, quartz substrates, resin substrates, or the like. In a case where the transparent substrates 66 are glass substrates, the transparent substrates 66 are bonded to each other by glass bonding or the like, and thus there is no need to use an adhesive. In addition, the transparent substrates 66 may be bonded to each other using an adhesive.

On the other hand, in a method illustrated in FIG. 7, a plurality of transparent substrates 66, each of which includes the partial reflection surface 55 formed on one side thereof, are overlapped without being shifted, and in this state, the transparent substrates 66 are bonded to each other via a bonding layer while applying a load to the transparent substrates 66, thereby forming a stacked body 68. At this time, the transparent substrates 66 on which the partial reflection surfaces 55 are not formed are also stacked. Next, the stacked body 68 is cut obliquely. As a result, the light guide portion 50 (second transparent member 62) is obtained. Even in this case, since the first surface 56 and the second surface 57 are formed by cut surfaces, polishing or the like is performed on the cut surfaces. The transparent substrates 66 are glass substrates, quartz substrates, resin substrates, or the like. In a case where the transparent substrates 66 are glass substrates, the transparent substrates 66 are bonded to each other by glass bonding or the like, and thus there is no need to use an adhesive. In addition, the transparent substrates 66 may be bonded to each other using an adhesive.

According to the method illustrated in FIG. 6, it is possible to reduce a loss in material. On the other hand, in the method illustrated in FIG. 7, since the plurality of transparent substrates 66 are entirely overlapped, when curing the adhesive while applying a load to the transparent substrates 66, by the method illustrated in FIG. 6, a uniform load is applied to the entire transparent substrates 66. Therefore, the transparent substrates 66 can be bonded to each other in a state of being in close contact with each other uniformly.

Here, the bonding surface 63 and the third surface 520 are formed by the transparent substrates 661 and 662 which are stacked between both ends of the light guide portion 50. In the present embodiment, the bonding surface 63 and the third surface 520 are inclined in the same direction as that of the partial reflection surface 55. Therefore, even in a case where the bonding surface 63 is formed by processing the transparent substrate 661 positioned on one end portion of the plurality of transparent substrates 66, unlike a case where the bonding surface 63 is inclined in a direction opposite to the partial reflection surface 55 (a case illustrated by a two-dot chain line L63), it is not necessary to make the transparent substrate 661 excessively thick. In addition, even in a case where the third surface 520 is formed by processing the transparent substrate 662 positioned on the other end portion of the plurality of transparent substrates 66, unlike a case where the third surface 520 is inclined in a direction opposite to the partial reflection surface 55 (a case illustrated by a two-dot chain line L520), it is not necessary to make the transparent substrate 662 excessively thick.

In particular, in the present embodiment, the bonding surface 63 and the other end 52 are parallel to the partial reflection surface 55. Thus, polishing or the like may be performed on the transparent substrate 661, and there is no need to perform processing for adjusting an angle of the transparent substrate 661. In addition, there is also no need to perform processing for adjusting an angle of the transparent substrate 662.

Therefore, the light guide portion 50 (second transparent member 62) including the bonding surface 63 and the third surface 520 formed on both ends thereof can be connected to the light-incident portion 40 at a low cost, and thus it is possible to reduce a cost of the display unit 10 (display apparatus 100). The thickness of the transparent substrate 661 is set corresponding to a distance between the bonding surface 63 and the partial reflection surface 55, and the thickness of the transparent substrate 662 is set corresponding to a distance between the third surface 520 and the partial reflection surface 55.

Second Embodiment

Figure 8:
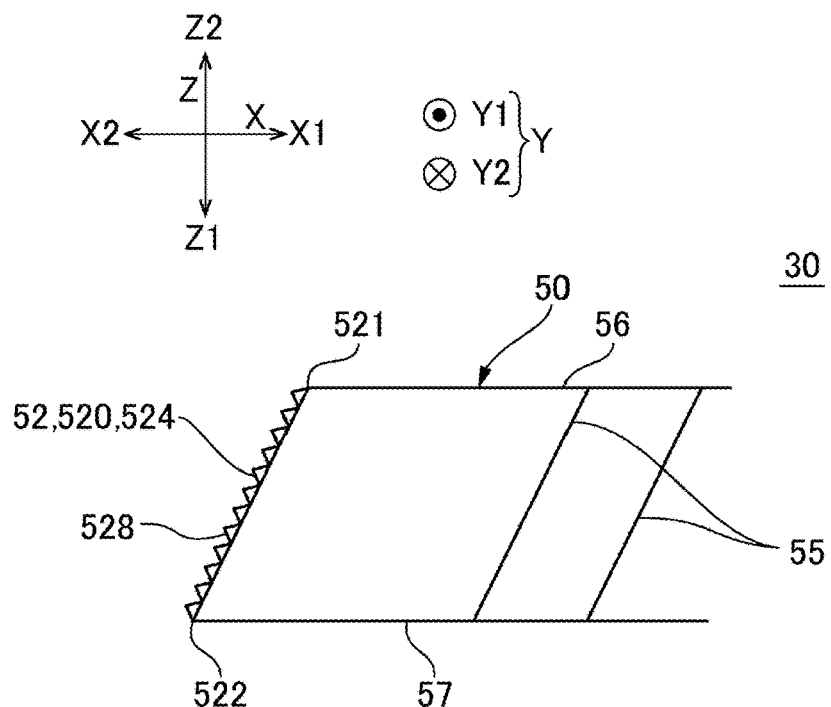
FIG. 8 is an enlarged explanatory diagram illustrating the third surface of the light guide portion of a light guide device according to a second embodiment.

FIG. 8 is an enlarged explanatory diagram illustrating the third surface 520 of the light guide portion 50 of the light guide system 30 according to a second embodiment. Since the basic configuration of the present embodiment and each embodiment to be described is the same as that of the first embodiment, the same reference numerals are given to the common portions, and a description thereof will be omitted.

As illustrated in FIG. 8, even in the present embodiment, similar to the first embodiment, the third surface 520 is inclined in the same direction as that of the partial reflection surface 55. Therefore, as described with reference to FIGS. 6 and 7, it is possible to efficiently manufacture the light guide portion 50. Even in the present embodiment, similar to the first embodiment, the third surface 520 of the light guide portion 50 is configured with the anti-reflection surface 524 having an anti-reflection structure for the image light beams L traveling through the light guide portion 50. In the present embodiment, as illustrated in FIG. 8, the third surface 520 is configured with the anti-reflection surface 524 which is a moth-eye type surface roughened by fine irregularities 528. According to the third surface 520 with this configuration, even in a case where the light beams, which transmit through the partial reflection surface 55 positioned at a position closest to the other end 52 side, reach the third surface 520 (end surface) of the light guide portion 50, occurrence of stray light due to reflection by the third surface 520 can be suppressed. Accordingly, the light beams reflected by the third surface 520 is not likely to be reflected by the partial reflection surface 55 and to reach the eye E of the observer, and thus occurrence of ghost on the image can be suppressed.

Third Embodiment

Figure 9:
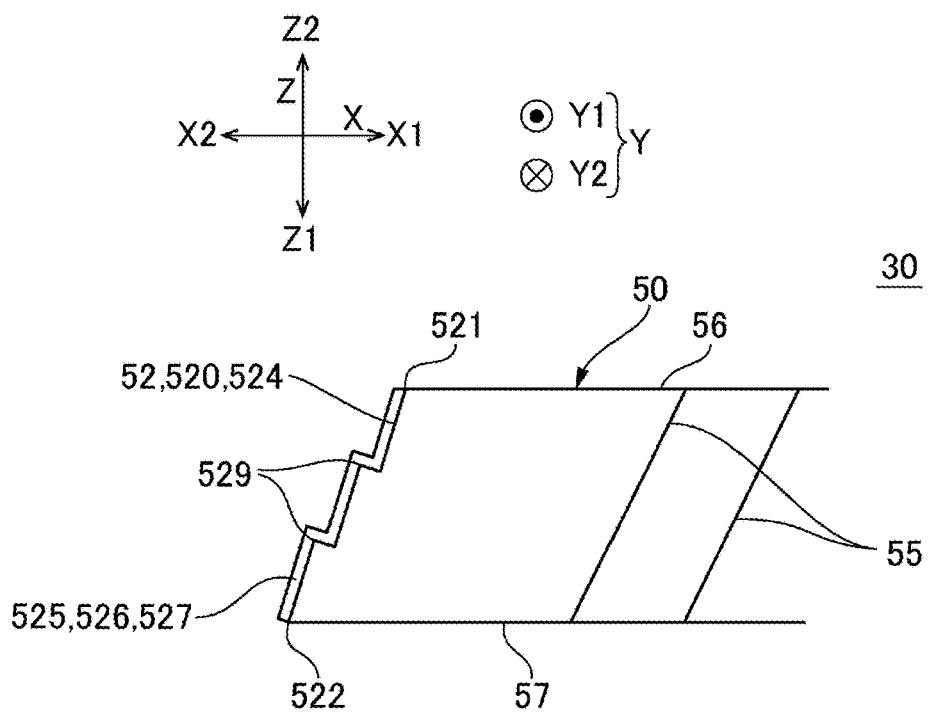
FIG. 9 is an enlarged explanatory diagram illustrating the third surface of the light guide portion of the light guide device according to a third embodiment.

FIG. 9 is an enlarged explanatory diagram illustrating the third surface 520 of the light guide portion 50 of the light guide system 30 according to a third embodiment. In the first embodiment, although the third surface 520 is a flat surface which is inclined in the same direction as that of the partial reflection surface 55, in the present embodiment, as illustrated in FIG. 9, stepped portions 529 are formed on the third surface 520. Even in this case, the third surface 520 is inclined in the same direction as that of the partial reflection surface 55, and in the third surface 520, a first edge portion 521 positioned on the other side Z2 of the second direction Z is positioned closer to the one end 51 side than a second edge portion 522 positioned on one side Z1 of the second direction Z is. Therefore, as described with reference to FIGS. 6 and 7, there is no need to use a transparent substrate 662 with excessively thick thickness when manufacturing the light guide portion 50.

Even in the present embodiment, similar to the first embodiment, the third surface 520 of the light guide portion 50 is configured with the anti-reflection surface 524 having an anti-reflection structure for the image light beams L traveling through the light guide portion 50, and is covered by the anti-reflection film 525. The third surface 520 may be a moth-eye type surface which is roughened by the fine irregularities 528 described with reference to FIG. 8. According to the third surface 520 with this configuration, even in a case where the light beams, which transmit through the partial reflection surface 55 positioned at a position closest to the other end 52 side, reach the third surface 520 (end surface) of the light guide portion 50, occurrence of stray light due to reflection by the third surface 520 can be suppressed. Accordingly, the light beams reflected by the third surface 520 is not likely to be reflected by the partial reflection surface 55 and to reach the eye E of the observer, and thus occurrence of ghost on the image can be suppressed.

Fourth Embodiment

Figure 10:
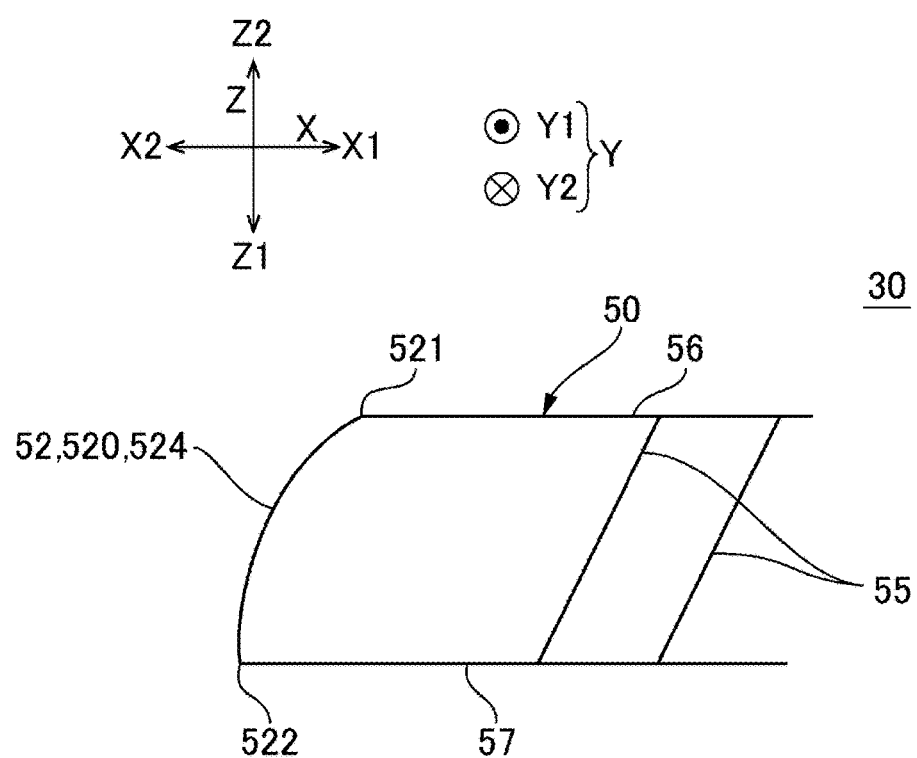
FIG. 10 is an enlarged explanatory diagram illustrating the third surface of the light guide portion of the light guide device according to a fourth embodiment.

FIG. 10 is an enlarged explanatory diagram illustrating the third surface 520 of the light guide portion 50 of the light guide system 30 according to a fourth embodiment. In the first embodiment, although the third surface 520 is a flat surface, in the present embodiment, as illustrated in FIG. 10, the third surface 520 is an anti-reflection surface 524 having an anti-reflection structure using a curved surface. In FIG. 10, although the third surface 520 is formed of a convex curved surface, the third surface 520 may be a concave curved surface. In addition, the third surface 520 may be a free curved surface. In any case, since the light beams having a small incident angle with respect to the third surface 520 occupy a large proportion of the light beams reaching the third surface 520, occurrence of stray light due to reflection by the third surface 520 can be suppressed. In addition, since the third surface 520 is a curved surface, the light beams reflected by the third surface 520 is not likely to be reflected by the partial reflection surface 55 and to reach the eye E of the observer. Therefore, occurrence of ghost on the image can be suppressed.

A configuration in which the third surface 520 is formed of the anti-reflection surface 524 configured with the anti-reflection film 525 or the light absorption layer 527 described in the first embodiment, or a configuration in which the third surface 520 is formed of the anti-reflection surface 524 configured with a composite layer obtained by stacking the dielectric multilayer film 526 and the light absorption layer 527 in order, may be adopted. In addition, a configuration in which the third surface 520 is formed of the anti-reflection surface 524 configured with a moth-eye type surface which is roughened by the fine irregularities 528 described in the second embodiment, may be adopted.

Even in the present embodiment, in the third surface 520, a first edge portion 521 positioned on the other side Z2 of the second direction Z is positioned closer to the one end 51 side than a second edge portion 522 positioned on one side Z1 of the second direction Z is. Therefore, as described with reference to FIGS. 6 and 7, there is no need to use a transparent substrate 662 with excessively thick thickness when manufacturing the light guide portion 50.

Fifth Embodiment

Figure 11:
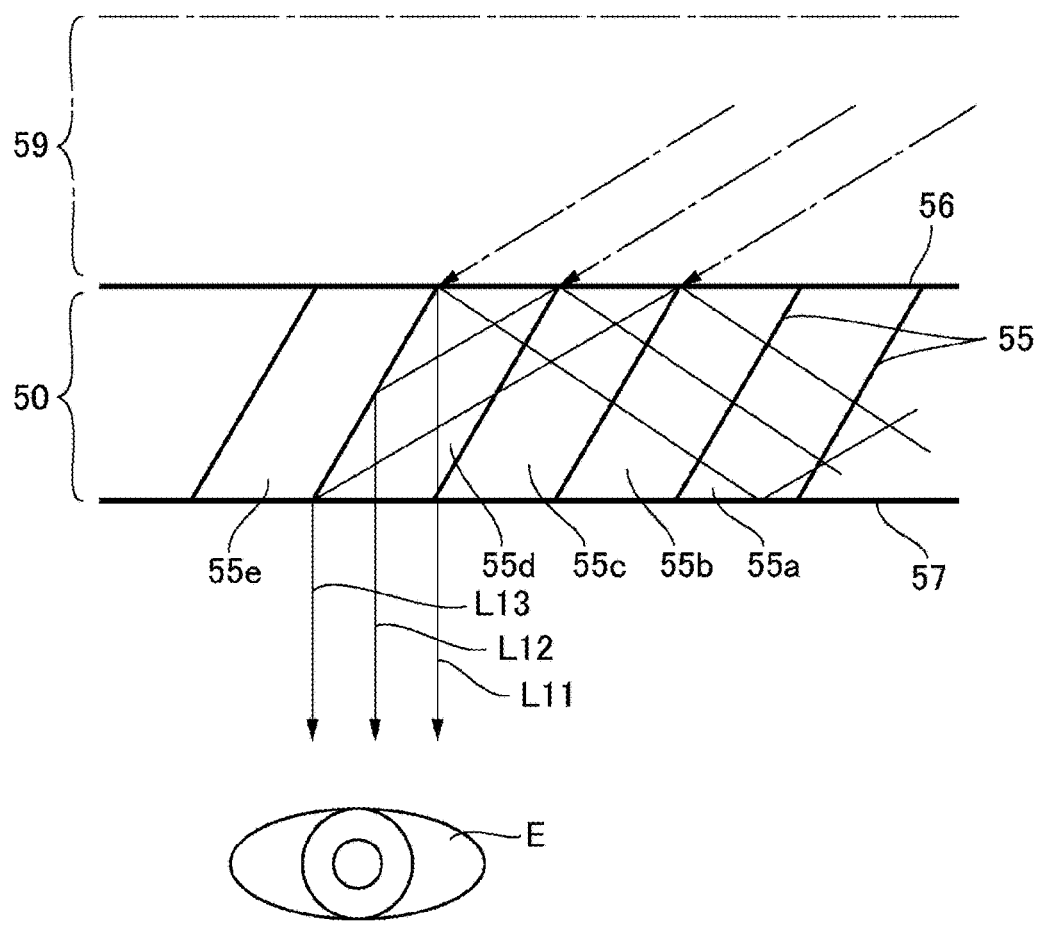
FIG. 11 is an explanatory diagram of the light guide portion of the display apparatus according to a fifth embodiment.

FIG. 11 is an explanatory diagram of the light guide portion 50 of the display apparatus 100 according to a fifth embodiment. In the present embodiment, the partial reflection surface 55 formed in the light guide portion 50 illustrated in FIG. 2 has a characteristic in that a transmittance and a reflectance change according to the incident angle. In the present embodiment, when the incident angle is large, the plurality of partial reflection surfaces 55 have a larger reflectance than the reflectance when the incident angle is small.

In the present embodiment, an angle formed by the partial reflection surface 55 and the second surface 57 is 45° to 70°. In addition, when the incident angle with respect to the partial reflection surface 55 is small, the transmittance is 98% or more, and the reflectance is 2% or less. On the other hand, when the incident angle with respect to the partial reflection surface 55 is large, the transmittance is 77%, and the reflectance is 23%. In this configuration, as described with reference to Tables 1, 2 and 3, a variation in brightness of the image light beams L emitted from each position of the light-emitting portion 58 in the first direction X can be reduced. More specifically, although light-emitting intensity of the image light beams L decreases in the light-emitting portion 58 as a distance from the light-incident portion 40 increases in the first direction X, according to the present embodiment, the decrease in the light-emitting intensity can be suppressed.

TABLE 1

| LIGHT-EMITTING POSITION | LIGHT BEAM | NUMBER OF TRANSMISSIONS TRANSMITTANCE OF 77% AT LARGE INCIDENT ANGLE | NUMBER OF TRANSMISSIONS TRANSMITTANCE OF 98% AT SMALL INCIDENT ANGLE | NUMBER OF REFLECTIONS AT LARGE INCIDENT ANGLE AND REFLECTANCE OF 23% | BRIGHTNESS (%) |
|---|---|---|---|---|---|
| PORTION 55a | L11 | 0 | 0 | 1 | 23.0 |
|  | L12 | 0 | 0 | 1 | 23.0 |
|  | L13 | 0 | 0 | 1 | 23.0 |
| PORTION 55b | L11 | 0 | 1 | 1 | 22.5 |
|  | L12 | 1 | 0 | 1 | 17.7 |
|  | L13 | 1 | 0 | 1 | 17.7 |
| PORTION 55c | L11 | 0 | 2 | 1 | 22.1 |
|  | L12 | 1 | 1 | 1 | 17.4 |
|  | L13 | 2 | 0 | 1 | 13.6 |
| PORTION 55d | L11 | 0 | 3 | 1 | 21.6 |
|  | L12 | 1 | 2 | 1 | 17.0 |
|  | L13 | 2 | 1 | 1 | 13.4 |
| PORTION 55e | L11 | 1 | 3 | 1 | 16.7 |
|  | L12 | 1 | 3 | 1 | 16.7 |
|  | L13 | 2 | 2 | 1 | 13.1 |

TABLE 2

| LIGHT-EMITTING POSITION | LIGHT BEAM | NUMBER OF TRANSMISSIONS AT TRANSMITTANCE OF 77% | NUMBER OF REFLECTIONS AT REFLECTANCE OF 23% | BRIGHTNESS (%) |
|---|---|---|---|---|
| PORTION 55a | L11 | 0 | 1 | 23.0 |
|  | L12 | 0 | 1 | 23.0 |
|  | L13 | 0 | 1 | 23.0 |
| PORTION 55b | L11 | 1 | 1 | 17.7 |
|  | L12 | 1 | 1 | 17.7 |
|  | L13 | 1 | 1 | 17.7 |
| PORTION 55c | L11 | 2 | 1 | 13.6 |
|  | L12 | 2 | 1 | 13.6 |
|  | L13 | 2 | 1 | 13.6 |
| PORTION 55d | L11 | 3 | 1 | 10.5 |
|  | L12 | 3 | 1 | 10.5 |
|  | L13 | 3 | 1 | 10.5 |
| PORTION 55e | L11 | 4 | 1 | 8.1 |
|  | L12 | 4 | 1 | 8.1 |
|  | L13 | 4 | 1 | 8.1 |

TABLE 3

| LIGHT-EMITTING POSITION | LIGHT BEAM | NUMBER OF TRANSMISSIONS AT TRANSMITTANCE OF 77% | NUMBER OF REFLECTIONS AT REFLECTANCE OF 23% | BRIGHTNESS (%) |
|---|---|---|---|---|
| PORTION 55a | L11 | 0 | 1 | 23.0 |
|  | L12 | 0 | 1 | 23.0 |
|  | L13 | 0 | 1 | 23.0 |
| PORTION 55b | L11 | 0 | 1 | 23.0 |
|  | L12 | 1 | 1 | 17.7 |
|  | L13 | 1 | 1 | 17.7 |
| PORTION 55c | L11 | 0 | 1 | 23.0 |
|  | L12 | 0 | 1 | 17.7 |
|  | L13 | 2 | 1 | 13.6 |
| PORTION 55d | L11 | 0 | 1 | 23.0 |
|  | L12 | 1 | 1 | 17.7 |
|  | L13 | 2 | 1 | 13.6 |
| PORTION 55e | L11 | 0 | 1 | 23.0 |
|  | L12 | 1 | 1 | 17.7 |
|  | L13 | 2 | 1 | 13.6 |

For example, in a case where the brightness (light-emitting intensity) of the light beams emitted from each portion between the partial reflection surfaces 55 illustrated in FIG. 2 is calculated, as shown in a result of Table 1, a variation in brightness of the image light beams L emitted from each position of the light-emitting portion 58 in the first direction X can be reduced. Table 1 shows the number of transmissions and the number of reflections until the image light beams L are emitted from portions 55a, 55b, 55c, 55d, and 55e between the partial reflection surfaces 55 illustrated in FIG. 11. The number of reflections when the image light beams L are finally reflected at a large incident angle is shown. On the other hand, in a case where the incident angle is large and a case where the incident angle is small, there is a difference in the number of transmissions. In the present embodiment, the transmittance at the partial reflection surface 55 differs depending on the incident angle. Therefore, the number of transmissions is shown by being divided into a case where the incident angle is large and a case where the incident angle is small. In addition, among the light beams emitted from the portions 55a, 55b, 55c, 55d, and 55e illustrated in FIG. 11, Table 1 shows brightness of the light beam L11 emitted from the portion positioned closest to one side X1 of the first direction X, the light beam L12 emitted from the portion positioned at the center in the first direction X, and the light beam L13 emitted from the portion positioned closest to the other side X2 of the first direction X.

As can be seen from Table 1, the brightness in each of the portions 55a, 55b, 55c, 55d, and 55e is from 13.1% to 23%, and a variation in brightness is small. In addition, a variation in brightness of the light beams L11, L12, and L13 emitted from each of the portions 55a, 55b, 55c, 55d, and 55e is small. On the other hand, in a case where the transmittance at the partial reflection surface 55 is 77% or more and the reflectance at the partial reflection surface 55 is 23% regardless of the incident angle with respect to the partial reflection surface 55, the brightness of each of the light beams L11, L12, and L13 emitted from each of the portions 55a, 55b, 55c, 55d, and 55e is shown in Table 2. As can be seen from Table 2, the brightness of each of the light beams L11, L12, and L13 emitted from each of the portions 55a, 55b, 55c, 55d, and 55e is from 8.1% to 23%, and a variation in brightness is large.

In addition, as illustrated in FIG. 11, in a case where a light-transmitting layer 59 in which the partial reflection surfaces 55 are not formed is provided on the light guide portion 50, in which the partial reflection surfaces 55 are formed, on the other side Z2 of the second direction Z, the number of transmissions through the partial reflection surfaces 55 can be reduced. Therefore, in a case where the transmittance at the partial reflection surface 55 is 77% or more and the reflectance at the partial reflection surface 55 is 23% regardless of the incident angle with respect to the partial reflection surface 55, the brightness of each of the light beams L11, L12, and L13 emitted from each of the portions 55a, 55b, 55c, 55d, and 55e is shown in Table 3. As can be seen from Table 3, the brightness of each of the light beams L11, L12, and L13 emitted from each of the portions 55a, 55b, 55c, 55d, and 55e is from 13.1% to 23%, and a variation in brightness is small. Here, in this case, the thickness of the light guide system 30 in the second direction Z is increased by the provision of the light-transmitting layer 59.

Therefore, as in the present embodiment, instead of providing the light-transmitting layer 59 (refer to FIG. 11) in which the partial reflection surfaces 55 are not formed, the light guide portion 50 is formed only by the portion in which the partial reflection surfaces 55 are formed, and thus, even in a case where the thickness of the light guide portion 50 is decreased, it is possible to reduce a difference in brightness of the image light beams L emitted from a position of the light-emitting portion 58 away from the light-incident portion 40 in the first direction X. In addition, a variation in brightness of the light beams L11, L12, and L13 emitted from each of the portions 55a, 55b, 55c, 55d, and 55e can be reduced. Further, since unnecessary reflection at the partial reflection surfaces 55 is reduced, it is possible to suppress a deterioration in display quality due to occurrence of ghost.

Sixth Embodiment

In the fifth embodiment, when the incident angle with respect to the partial reflection surface 55 is large, the reflectance of the partial reflection surface 55 is larger than that when the incident angle with respect to the partial reflection surface 55 is small. On the other hand, for example, in a case where an angle formed by the partial reflection surface 55 and the second surface 57 is 25° to 40°, when the incident angle with respect to the partial reflection surface 55 is small, a configuration in which the reflectance of the partial reflection surface 55 is larger than that when the incident angle with respect to the partial reflection surface 55 is large, may be adopted.

Seventh Embodiment

Figure 12:
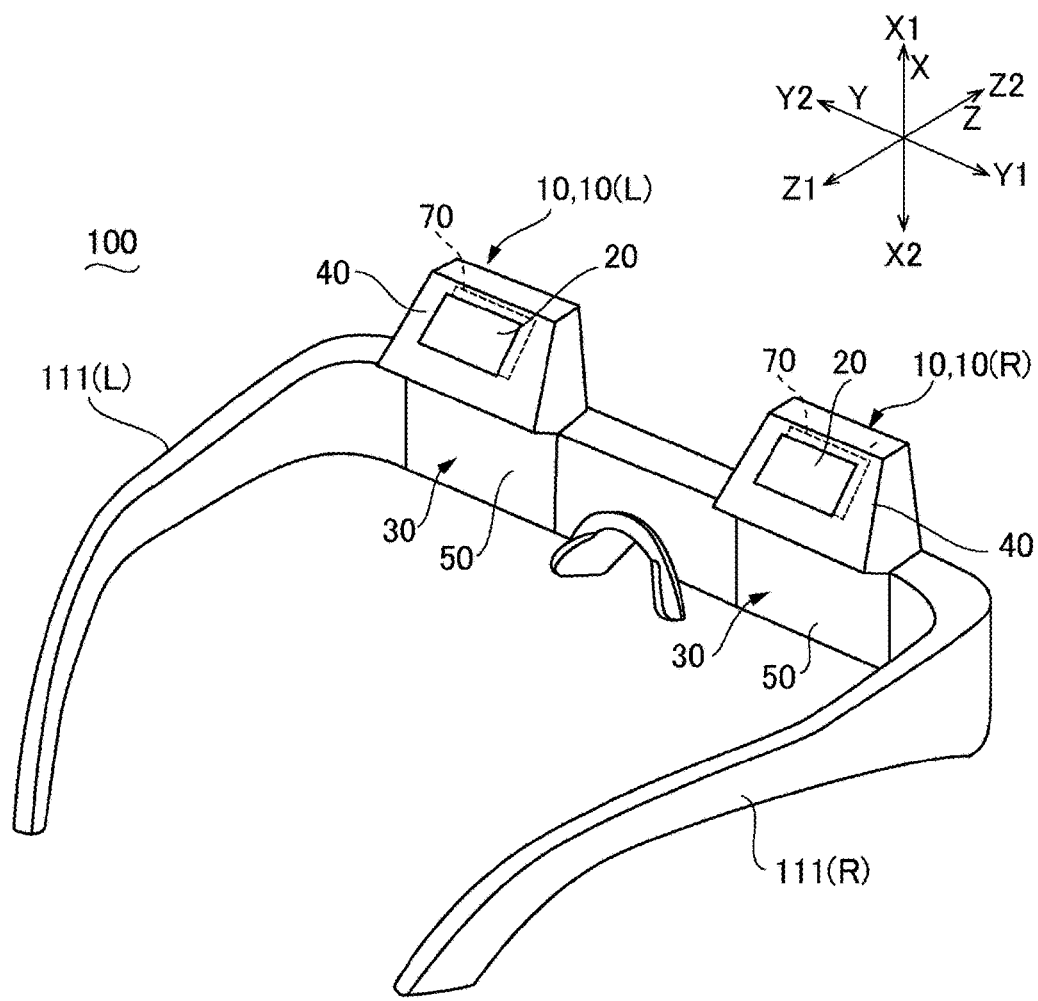
FIG. 12 is an explanatory view illustrating an example of an appearance of the display apparatus according to a seventh embodiment.
Figure 13:
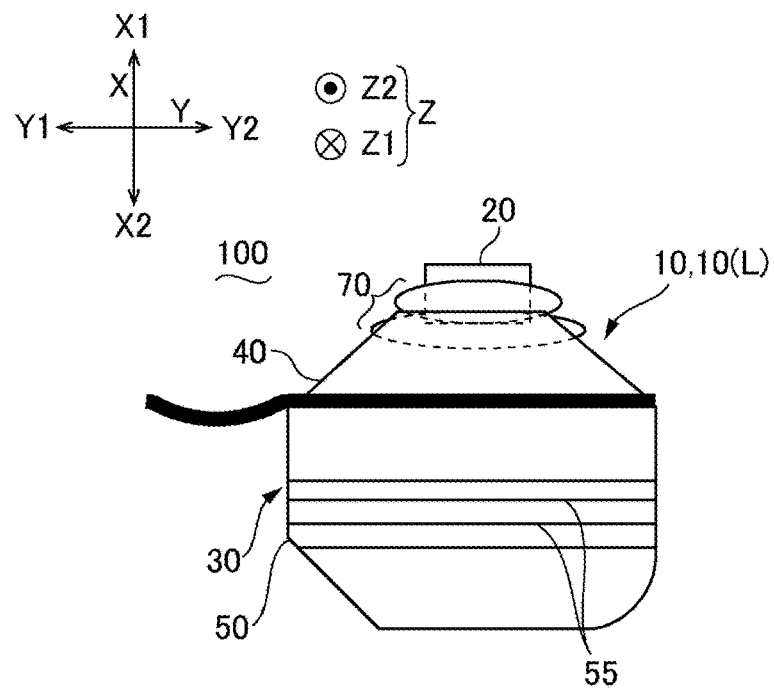
FIG. 13 is a front view of the display apparatus illustrated in FIG. 12 when viewed from a front direction of an observer.
Figure 14:
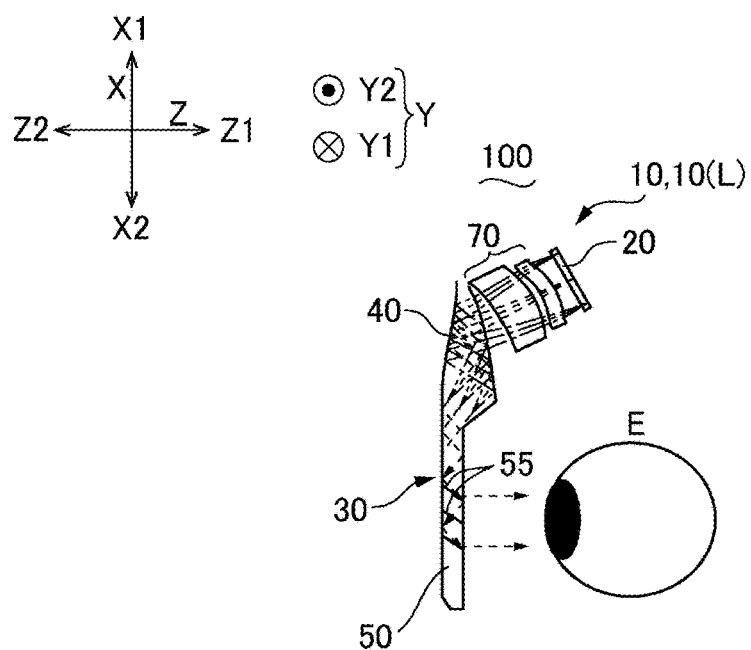
FIG. 14 is a side view of the display apparatus illustrated in FIG. 12 when viewed from a left side.

FIG. 12 is an explanatory view illustrating an example of an appearance of the display apparatus 100 according to a seventh embodiment. FIG. 13 is a front view of the display apparatus 100 illustrated in FIG. 12 when viewed from a front direction of the observer. FIG. 14 is a side view of the display apparatus 100 illustrated in FIG. 12 when viewed from a left side. In the display apparatus 100 according to the first embodiment, the image generation system 20 and the light-incident portion 40 are disposed on an ear side, and the image light beams L are guided from the ear side toward a nose side. On the other hand, in the present embodiment, as illustrated in FIGS. 12, 13, and 14, the image generation system 20 and the light-incident portion 40 are disposed in front of the eye and above the eye, and the light guide portion 50 extends from an upper side toward a lower side. Thus, the image light beams L are guided from the upper side toward the lower side, and are emitted toward the eye. Therefore, in the present embodiment, an upper-lower direction corresponds to the first direction X, a front-rear direction corresponds to the second direction Z, and a right-left direction corresponds to the third direction Y. In addition, one side X1 of the first direction X corresponds to the upper side, and the other side X2 of the first direction X corresponds to the lower side.

Other Embodiments

In the embodiments described above, an anti-reflection film may be provided on the first surface 56 or the second surface 57. Even in a case where light beams from the outside (see-through light beams) are transmitted or a case where the image light beams L are emitted from the light guide portion 50 to the outside, when reflection occurs at an interface between the light guide portion 50 and the light-incident portion 40, a loss in the light beams occurs due to the reflection. Therefore, by providing the anti-reflection film, it is possible to increase the brightness for both of the see-through light beams and the image light beams L. In addition, an amount of unnecessary return light beams can be decreased, and thus occurrence of ghost can be suppressed.

The entire disclosure of Japanese Patent Application No. 2017-062401, filed Mar. 28, 2017 is expressly incorporated by reference herein.

What is claimed is:
1. A light guide device comprising:
   a transparent light guide portion that guides light beams incident from one end side to a light-emitting portion,
   wherein the light guide portion includes
      a first surface that extends from the one end side on which the light beams are incident toward another end side in a first direction, a second surface that extends in the first direction and in parallel to the first surface in one side of a second direction intersecting with the first direction, a third surface that is positioned between the first surface and the second surface at the another end side of the light guide portion, and a plurality of partial reflection surfaces that are disposed along the first direction between the first surface and the second surface and are inclined at the same angle from a normal direction with respect to the second surface toward the one end side when viewed from a third direction intersecting with the first direction and the second direction, and wherein the third surface is a surface with an anti-reflection structure and is parallel to at least one of the plurality of partial reflection surfaces.

2. The light guide device according to claim 1,
wherein a first edge portion of the third surface positioned on the another side of the second direction is positioned closer to the one end side than a second edge portion of the third surface positioned on the one side of the second direction is.

3. The light guide device according to claim 2,
wherein the third surface is a flat surface which is inclined in the same direction as that of the plurality of partial reflection surfaces.

4. A display apparatus comprising:
the light guide device according to claim 3; and
an image generation system that generates image light beams,
wherein the light guide device includes a transparent light-incident portion to which the one end side of the light guide portion is connected,
wherein the light-incident portion includes a light-incident curved surface on which the image light beams as non-parallel light beams are incident and a light-reflective curved surface which reflects the image light beams incident from the light-incident curved surface, and
wherein the image light beams are converted into parallel light beams by the light-incident curved surface and the light-reflective curved surface and are emitted to the light guide portion.

5. The light guide device according to claim 2,
wherein the third surface is a curved surface.

6. A display apparatus comprising:
the light guide device according to claim 5; and
an image generation system that generates image light beams,
wherein the light guide device includes a transparent light-incident portion to which the one end side of the light guide portion is connected,
wherein the light-incident portion includes a light-incident curved surface on which the image light beams as non-parallel light beams are incident and a light-reflective curved surface which reflects the image light beams incident from the light-incident curved surface, and
wherein the image light beams are converted into parallel light beams by the light-incident curved surface and the light-reflective curved surface and are emitted to the light guide portion.

7. The light guide device according to claim 2,
wherein a plurality of stepped portions are formed on the third surface.

8. A display apparatus comprising:
the light guide device according to claim 2; and
an image generation system that generates image light beams,
wherein the light guide device includes a transparent light-incident portion to which the one end side of the light guide portion is connected,
wherein the light-incident portion includes a light-incident curved surface on which the image light beams as non-parallel light beams are incident and a light-reflective curved surface which reflects the image light beams incident from the light-incident curved surface, and
wherein the image light beams are converted into parallel light beams by the light-incident curved surface and the light-reflective curved surface and are emitted to the light guide portion.

9. The light guide device according to claim 1,
wherein the third surface is covered with an anti-reflection film.

10. The light guide device according to claim 9,
wherein the anti-reflection film is a dielectric multilayer film.

11. The light guide device according to claim 9,
wherein the anti-reflection film is a light absorption layer.

12. The light guide device according to claim 9,
wherein the anti-reflection film is a composite layer in which a dielectric multilayer film and a light absorption layer are formed in order.

13. The light guide device according to claim 1,
wherein fine irregularities are formed on the third surface.

14. The light guide device according to claim 1,
wherein at least one partial reflection surface among the plurality of partial reflection surfaces includes a multilayer film including a reflective metal layer.

15. The light guide device according to claim 1,
wherein the plurality of partial reflection surfaces have a characteristic in which a reflectance changes according to an incident angle.

16. A display apparatus comprising:
the light guide device according to claim 1; and
an image generation system that generates image light beams,
wherein the light guide device includes a transparent light-incident portion to which the one end side of the light guide portion is connected,
wherein the light-incident portion includes a light-incident curved surface on which the image light beams as non-parallel light beams are incident and a light-reflective curved surface which reflects the image light beams incident from the light-incident curved surface, and
wherein the image light beams are converted into parallel light beams by the light-incident curved surface and the light-reflective curved surface and are emitted to the light guide portion.

17. The display apparatus according to claim 16,
wherein the light-incident portion is formed of a first transparent member,
wherein the first transparent member is surface-bonded to a second transparent member via a bonding surface in the first direction, and
wherein at least the plurality of partial reflection surfaces of the light guide portion are formed of the second transparent member.

18. The display apparatus according to claim 17,
wherein a first end portion of the bonding surface positioned on the other side of the second direction is positioned closer to the one end side than a second end portion of the bonding surface positioned on the one side of the second direction is.

19. A light guide device comprising:
a transparent light guide portion that guides light beams incident from one end side to a light-emitting portion,
wherein the light guide portion includes
   a first surface that extends from the one end side on which the light beams are incident toward another end side in a first direction,
   a second surface that extends in the first direction and in parallel to the first surface in one side of a second direction intersecting with the first direction,
   a third surface that is positioned between the first surface and the second surface at the another end side of the light guide portion, and
   a plurality of partial reflection surfaces that are disposed along the first direction between the first surface and the second surface and are inclined at the same angle from a normal direction with respect to the second surface toward the one end side when viewed from a third direction intersecting with the first direction and the second direction, and
wherein a first edge portion of the third surface positioned on the another side of the second direction is positioned closer to the one end side than a second edge portion of the third surface positioned on the one side of the second direction is, and
the third surface is a surface with an anti-reflection structure, is a flat surface which is inclined in the same direction as that of the plurality of partial reflection surfaces, and is parallel to the plurality of partial reflection surfaces.

20. A display apparatus comprising:
the light guide device according to claim 19; and
an image generation system that generates image light beams,
wherein the light guide device includes a transparent light-incident portion to which the one end side of the light guide portion is connected,
wherein the light-incident portion includes a light-incident curved surface on which the image light beams as non-parallel light beams are incident and a light-reflective curved surface which reflects the image light beams incident from the light-incident curved surface, and
wherein the image light beams are converted into parallel light beams by the light-incident curved surface and the light-reflective curved surface and are emitted to the light guide portion.

* * * * *